UNITED STATES PATENT OFFICE 2,133,350

SULPHUR DYES OF 3,4,5,6-DIBENZO-CARBAZOLE

Walter Hagge, Wolfen, kreis Bitterfeld, and Karl Haagen, Dessau in Anhalt, Germany, assignors to General Aniline Works, Inc., New York, N. Y., a corporation of Delaware No Drawing. Application May 7, 1937, Serial No. 141,246. In Germany May 23, 1936

8 Claims. (Cl. 260—130)

This invention relates to the manufacture of a catechu brown dye by baking 3,4,5,6-dibenzo-carbazole of the formula

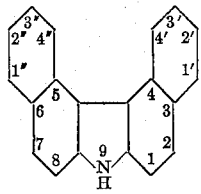

with sulphur. The dye is characterized by the clearness and reddish cast of its tints and with otherwise equally good properties surpasses considerably the known catechu-mark of sulphur dyes in respect of fastness to light. The invention includes the sulphurization of substitution products of this carbazole whereby dyes especially fast to light are made: as such substituents we enumerate halogen, the nitro-, —OH, and —SO₃H group; the amino group in 9-position may be acetylated. The known sulphurizing processes may be employed for producing the dyes, the kind of substitution determines which of these processes will be better for the purpose, however, by a few simple comparative experiments the best sulphurizing process to be employed with a particular substitution product, is easily determined. By the known addition of metallic or non-metallic substances to the sulphur-melt the color tint and the fastness of the dye may be influenced.

The following examples illustrate the invention, the parts being by weight:—

Example 1.—200 parts of 3,4,5,6-dibenzo-carbazole, 800 parts of sulphur and 20 parts of copper sulphate are together heated in the course of about 6 hours to 220 to 320° C. and kept at this temperature until the formation of H₂S ceases. The melt is then dissolved in known manner by means of sodium sulphide and/or caustic soda solution; from this solution the dye is precipitated by means of acid and is then dried in a vacuum or stirred with sodium sulphide before drying. The sulphur dye thus obtained dyes cotton catechu brown tints and has good properties of fastness, particularly fastness to light. By after-treatment with a chromium and/or copper compound the fastness to boiling of the dyeings is especially improved without notable change of tint.

Example 2.—100 parts of 2,7-dinitro-3,4,5,6-dibenzo-9-acetylcarbazole are introduced into a polysulphide solution made from 500 parts of sodium sulphide crystals and 200 parts of sulphur and the mixture is heated to boiling in a reflux apparatus. After boiling for about 20 hours a further 400 parts of sodium sulphide are added and the whole is evaporated to dryness and the residue is heated gradually to 250° C. After about 6 hours the formation of dye is finished. The mass is then dissolved in water and the dye precipitated by means of acid. It dyes cotton brown tints. The dyeings have good general fastness, particularly good fastness to light.

If the sulphurization is conducted with addition of a copper salt a considerably more yellow-green tint is obtained.

Example 3.—Into a poly-sulphide solution made from 200 parts of sodium sulphide crystals and 100 parts of sulphur are introduced 100 parts of sodium 3,4,5,6-dibenzocarbazole-3′,3′′-disulphonate and 15 parts of crystallized copper sulphate; the mixture is heated to boiling and stirred in a reflux apparatus. After boiling for about 16 hours (at 110° C.) the whole is evaporated to dryness and the residue heated so that the temperature rises gradually to 280 to 300° C. After baking in this manner for 20 hours the mass is allowed to cool. It may be used either directly for dyeing or it may be dissolved in water and the dye separated in known manner. It dyes cotton khaki tints of good fastness to light.

Example 4.—400 parts of sulphur are melted in the oil bath and the mixture of 30 parts of 4,4′-dibromo-1,1′-dinaphtho-2,2′-carbazole with 40 parts of benzidine is introduced. In the course of about 7 hours the temperature of the oil bath is raised to 280° C. and is then held at this temperature for about 12 hours. By working up the crude mass in the known manner 190 parts of the dye are obtained. This dyes cotton bronze tints of good fastness to washing, acids, boiling and light.

It is obvious that our invention is not limited to the foregoing examples or to the specific details given therein. Thus the conditions during the sulphurization may be varied according to the known processes for preparing sulphur dyes.

By addition of, for instance, benzidine or other sulphurizable organic compounds the shades of the resulting dyes may be varied.

What we claim is:—

1. The process which comprises sulphurizing a 3,4,5,6-dibenzocarbazole of the general formula

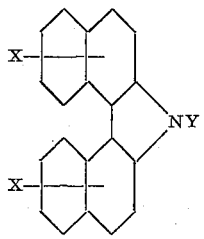

wherein X is a member of the group consisting of hydrogen, hydroxy, nitro, halogen, —SO$_3$H, and Y is a member of the group consisting of hydrogen and acetyl.

2. The process which comprises sulphurizing 3,4,5,6-dibenzocarbazole.

3. The process which comprises heating 3,4,5,6-dibenzocarbazole together with sulphur to about 220 to about 320° C.

4. The process which comprises heating 3,4,5,6-dibenzocarbazole together with sulphur to about 220 to about 320° C. in the presence of copper sulphate.

5. The sulphur dye as obtainable according to claim 1.

6. The sulphur dye as obtainable according to claim 2.

7. The sulphur dye as obtainable according to claim 3.

8. The sulphur dye as obtainable according to claim 4.

WALTER HAGGE.
KARL HAAGEN.